United States Patent [19]

Arakawa et al.

[11] Patent Number: 5,699,136
[45] Date of Patent: Dec. 16, 1997

[54] NEGATIVE UNIAXIAL ANISOTROPIC ELEMENT AND METHOD FOR MANUFACTURING THE SAME

[75] Inventors: Kohei Arakawa; Yosuke Nishiura; Yoji Ito, all of Minami-Ashigara, Japan

[73] Assignee: Fuji Photo Film Co., Ltd., Minami-Ashigara, Japan

[21] Appl. No.: 443,313

[22] Filed: May 17, 1995

Related U.S. Application Data

[63] Continuation-in-part of Ser. No. 152,381, Nov. 16, 1993, abandoned.

[30] Foreign Application Priority Data

Nov. 18, 1992 [JP] Japan .................................. 4-308377
Jun. 24, 1993 [JP] Japan .................................. 5-153265

[51] Int. Cl.6 .................................................. G02F 1/1335
[52] U.S. Cl. ........................ 349/118; 349/86; 349/191
[58] Field of Search .............................. 359/73, 76, 77, 359/51, 99, 102, 103, 494, 500; 428/1; 349/117, 118, 86, 183, 191

[56] References Cited

U.S. PATENT DOCUMENTS 5,375,006  12/1994  Haas ........................... 359/73
5,380,459  1/1995   Kanemoto et al. ........... 359/93
5,506,706  4/1996   Yamahara et al. ............ 359/73

FOREIGN PATENT DOCUMENTS 4-113301  4/1992  Japan ........................ 359/73
5-257013  10/1993 Japan ........................ 359/73

Primary Examiner—William L. Sikes
Assistant Examiner—Tai V. Duong
Attorney, Agent, or Firm—Burns, Doane, Swecker & Mathis, LLP

[57] ABSTRACT

The present invention provides an optically anisotropic element to be used for improvement of visual angle characteristics for display contrast and display color of TN type liquid crystal display element, and to a method for manufacturing the same. The optically anisotropic element has a liquid crystal display element, which comprises a liquid crystal cell, in which a twist nematic liquid crystal is squeezed between two electrode substrates and two polarizing elements disposed on both sides thereof, said optically anisotropic element being disposed between said liquid crystal cell and said polarizing element, whereby it has sheet-like structure and exhibits negative uniaxial property and is arranged in such manner that its optical axis is neither perpendicular nor in parallel to sheet surface, for example, it is inclined at an angle of 10° to 40° from a direction perpendicular to sheet surface. As the result, phase difference caused by the liquid crystal cell CE with respect to oblique incident light is compensated by phase difference of the optically anisotropic element RF, and a liquid crystal display element of high quality with no dependence on visual angle can be obtained.

3 Claims, 8 Drawing Sheets

NEGATIVE UNIAXIAL ANISOTROPIC ELEMENT AND METHOD FOR MANUFACTURING THE SAME

This application is a continuation-in-part of U.S. Ser. No. 08/152,381, filed Nov. 16, 1993, now abandoned the contents of which are hereby incorporated by reference.

BACKGROUND OF THE INVENTION

The present invention relates to an optically anisotropic element and a method for manufacturing the same, and in particular to an optically anisotropic element to be used for improvement of visual angle characteristics of display contrast and display color of a twist nematic liquid crystal display element and a method for manufacturing such optically anisotropic element.

Cathode ray tube (CRT) constitutes a main stream of display element for electronic office system such as Japanese language word-processors, desk-top personal computers, etc., while CRT is now being replaced by liquid crystal display element because the latter has many advantages such as thin lightweight design, low power consumption, etc. Most of the liquid crystal display element (hereinafter referred as "LCD") now propagated use twist nematic liquid crystal. Display system using such liquid crystal can be roughly divided into birefringence mode and optical rotatory mode.

In LCD using birefringence mode, twist angle of liquid crystal molecules is twisted by more than 90° and it has steep electro-optical characteristics. Thus, it can provide large capacity display by time-sharing addressing even with simple matrix type electrode structure without active elements (such as thin film transistor or diode). However, it has disadvantages such as slow response speed (several hundred milliseconds) or difficulty in gradation display, and its display characteristics do not surpass the display characteristics of liquid crystal display element using active elements (such as TFT-LCD, MIM-LCD, etc.).

TFT-LCD and MIM-LCD use display system of optical rotatory mode with the arrangement of liquid crystal molecules twisted by 90° (twist nematic ["TN"] liquid crystal display element). This display system provides fast response speed (several tens of milliseconds), gives black/white display easily, and achieves high display contrast, and it is a very promising system compared with other LCD systems. However, because it uses twist nematic liquid crystal, display color or display contrast varies according to the viewing direction because of the principle of its display system, and it is not superior to CRT in the display characteristics.

To solve the above problem, various methods have been proposed to increase visual angle by arranging a phase-shift film between a pair of polarizing plates and TN liquid crystal cell, as disclosed in Japanese Patent Laid-Open Publications 4-229828 and 4-258923.

In the phase-shift film proposed in the above patent publications, phase difference in the direction perpendicular to liquid crystal cell surface is almost zero. There is no optical effect when seen from front direction, and phase difference occurs when seen from oblique direction, and phase difference caused by liquid crystal cell is compensated. Even by these methods, however, it is still insufficient for visual angle of LCD, and there is strong demand for further improvement.

In particular, in the device used on board of vehicle or used as an alternative to CRT, the visual angle of the currently used device cannot meet the requirements. It is generally known that liquid crystal molecule has different refractive indices in longer axis direction and shorter axis direction. When polarized light enters such liquid crystal molecule having anisotropic property in refractive index, polarizing condition varies according to the angle of the liquid crystal molecule. In the twist nematic liquid crystal, the arrangement of liquid crystal molecules is twisted in the direction perpendicular to the surface of liquid crystal cell. The light passing through the liquid crystal cell is sequentially polarized according to orientation of individual liquid crystal molecule of the twisted arrangement. Therefore, polarized state of the light propagated through the liquid crystal cell differs between the case where light enters perpendicularly to liquid crystal cell and the case where it enters obliquely to liquid crystal cell. As the result, display pattern is seen as inverted or is not seen at all, depending upon the viewing direction, and this is not desirable in practical application.

SUMMARY OF THE INVENTION

To solve the above problems, it is an object of the present invention to provide an optically anisotropic element to be used for improvement of visual angle characteristics of display contrast and display color of TN liquid crystal display element, and a method for manufacturing such optically anisotropic element.

To attain the above object, the optically anisotropic element of the present invention has a liquid crystal display element, comprising a liquid crystal cell, in which a twist nematic liquid crystal is squeezed between two electrode substrates and two polarizing elements disposed on both sides thereof, said optically anisotropic element being disposed between said liquid crystal cell and said polarizing element, whereby it has sheet-like structure and exhibits negative uniaxial property and is arranged in such manner that its optical axis is neither perpendicular nor in parallel to sheet surface.

In this case, it is preferable that optical axis is inclined by an angle of 10° to 40° to the direction perpendicular to sheet surface.

Such optically anisotropic element may contain low molecular weight liquid crystal oriented in macromolecular matrix. In this case, it is preferable that orientation of low molecular weight liquid crystal is fixed by one or more of either cross-linking between macromolecular matrices, cross-linking between low molecular weight liquid crystals, or cross-linking between macromolecular matrix and low molecular weight liquid crystal.

The optically anisotropic element may have the structure containing oriented liquid crystal type macromolecules. In this case, it is preferable that the liquid crystal macromolecules are oriented by casting or coating on a homeotropic orientation substrate or on an inclined orientation substrate.

The method for manufacturing optically anisotropic element of the present invention is to produce an optically anisotropic element, which has sheet-like structure, exhibits negative uniaxial property and optical axis thereof is arranged neither perpendicularly nor in parallel to sheet surface, whereby it is characterized in that low molecular weight liquid crystals are dispersed in macromolecular matrix, and orientation is adjusted by applying electric field or magnetic field.

Another method for manufacturing optically anisotropic element of the present invention is to produce optically anisotropic element, which has sheet-like structure, exhibits negative uniaxial property, and optical axis thereof is arranged neither perpendicularly nor in parallel to sheet surface, whereby a sheet made of the thermoplastic resin and having light transmission property is squeezed between heating rolls with different peripheral speeds to give shearing stress between two sides of the sheet.

A still another method for manufacturing an optically anisotropic element of the present invention is to produce optically anisotropic element, which has sheet-like structure, exhibits negative uniaxial property, and optical axis thereof is arranged neither perpendicularly nor in parallel to sheet surface, whereby liquid crystal macromolecules are casted or coated on a homeotropic orientation substrate or on an inclined orientation substrate, and orientation is adjusted by applying electric field or magnetic field.

In the following, taking an example on TN type liquid crystal display element, description will be given on operating principle of the present invention in connection with the drawings.

FIG. 1, FIG. 2 and FIG. 3 each represents polarizing condition of light propagating through a liquid crystal display element when voltage higher than threshold voltage is applied on a liquid crystal cell. The liquid crystal display element shows luminous state when voltage is not applied.

FIG. 2 represents polarizing state of light when light enters perpendicularly to a liquid crystal cell CE. When natural light L0 enters perpendicularly to a polarizing plate A having a polarizing axis PA, the light passing through the polarizing plate A is turned to linearly polarized light L1. In the figure, LC represents a liquid crystal molecular model, which schematically shows arrangement of liquid crystal molecules in a liquid crystal cell CE when sufficient voltage is applied on TN liquid crystal cell. In case longer axis of the liquid crystal molecule LC in the liquid crystal cell CE is in parallel to a path PS of the light, there is no difference in refractive index within a plane perpendicular to the light path PS. Therefore, no phase difference occurs between normal and abnormal light propagating through the liquid crystal cell CE, and the linearly polarized light L1 is propagated after passing through the liquid crystal cell CE. When a polarizing axis PB of a polarizing plate B is set perpendicularly to the polarizing axis PA of the polarizing plate A, light L2 passing through the liquid crystal cell CE cannot go through the polarizing plate B, and it is turned to dark state.

FIG. 3 shows polarizing state of light when the light L0 enters obliquely to the liquid crystal cell CE. In case natural light L0 enters obliquely, the polarizing light L1 passing through the polarizing plate A is turned to linearly polarized light almost completely. (In actual case, it is turned to elliptically polarized light due to property of the polarizing plate A.) In this case, longer axis of the liquid crystal molecule LC in the liquid crystal cell CE makes an angle with the light path PS, and difference of refractive index occurs within a plane perpendicular to the light path PS. The light L2 passing through the liquid crystal cell CE is turned to elliptically polarized light and reaches the polarizing plate B, and a part of light passes through the polarizing plate B. The transmission of light when light enters obliquely is not desirable because contrast of the liquid crystal display element is decreased.

In order to prevent the decrease of contrast due to oblique entering of light and to improve visual angle characteristics, it is proposed to arrange an optically anisotropic element RF with negative uniaxial property with its optical axis running in a direction perpendicular to the surface of the liquid crystal cell CE between the polarizing plate B and the liquid crystal cell CE. This optically anisotropic element RF with uniaxial property is a birefringence body, which has higher phase difference as incident angle of light to the optical axis increases. When light enters obliquely to the liquid crystal display element with the above arrangement and passes through the liquid crystal cell CE and is turned to elliptically polarized light L2, the elliptically polarized light is converted to initial linearly polarized light by phase delay effect when it passes through the optically anisotropic element RF, and it should be shut off by the polarizing plate B.

However, the actual effect to improve visual angle characteristics is not sufficient. The reason is as follows:

In most of TN-LCDs, normally white mode is adopted. In the visual angle characteristics in this mode, light transmittance from black display portion extremely increases as the visual angle is increased, resulting in rapid decrease of contrast. Black display is the state where voltage is applied. In this case, it is considered that TN liquid crystal cell CE is an optically anisotropic substance with positive uniaxial property. As shown in FIG. 4(a), if optical axis of the liquid crystal cell CE is running in the direction perpendicular to the surface of the liquid crystal cell CE, by arranging an optically anisotropic element RF of negative uniaxial property with its optical axis running in the direction perpendicular to the liquid crystal cell CE on incoming side or outgoing side of the liquid crystal cell CE, it is possible to compensate phase difference caused by the liquid crystal cell CE with respect to oblique incident light by phase difference of the optically anisotropic element RF, to convert elliptically polarized light L2 to linearly polarized light L3, and to shut off it by the polarizing plate B.

However, the liquid crystal molecule LC when voltage is applied is not perfectly perpendicular to substrate of the liquid crystal cell CE and is slightly inclined from the direction perpendicular to the substrate. Thus, the liquid crystal cell CE can be regarded as an optically anisotropic substance with positive uniaxial property with its optical axis slightly inclined from the direction perpendicular to the surface of the cell CE.

In case of intermediate gradation, inclined angle of the optical axis is further increased. Therefore, even when combined with the optically anisotropic element RF with negative uniaxial property with its optical axis running in the direction perpendicular to the liquid crystal cell CE, the compensation is not sufficient. For this reason, in the present invention, optical axis of the optically anisotropic element RF with negative uniaxial property is inclined from the direction perpendicular to the liquid crystal cell CE in accordance with the inclination of optical axis of the liquid crystal cell CE as shown in FIG. 4(b), and phase difference caused by the liquid crystal cell CE with respect to oblique incident light is compensated by phase difference of the optically anisotropic element RF. As shown in FIG. 1, the light L2 entering obliquely and turned to elliptically polarized light after passing through the liquid crystal cell CE is converted to initial linearly polarized light L3. Thus, it is possible to obtain a liquid crystal display element of high quality having the same transmittance and no dependence on visual angle to the light, which enters obliquely at different angles.

In this way, it is possible according to the present invention to extensively improve visual angle characteristics by the use of the optically anisotropic substance RF with negative uniaxial property and with optical axis inclined from the direction perpendicular to the liquid crystal cell CE. In the negative uniaxial optically anisotropic substance RF with inclined optical axis in the present invention is such that, when it is supposed that refractive indices in three axial directions of a sheet having optically anisotropic property are nα, nβ and nγ respectively in the ascending order of the values, there exists the relationship: nα<nβ=nγ. Because the optical axis is defined in the direction of nα, refractive index in the direction of optical axis is the smallest. However, there is no need that the value of nβ is strictly equal to the value of nγ, and it will suffice that these are approximately equal to each other. More concretely, there is no problem in practical application if $|n\beta-n\gamma|/|n\beta-n\alpha| \leq 0.2$. As the condition to extensively improve visual angle characteristics of TN liquid crystal cell, it is preferable that the direction of refractive index nα is inclined from the direction of optical axis, i.e. the direction perpendicular to the liquid crystal cell CE (the direction perpendicular to sheet surface), by an angle of 10° to 40°, or more preferably, by an angle of 10° to 30°. Further, if it is supposed that the thickness of sheet is D, it is preferable that the condition of $100 \leq (n\beta-n\alpha) \times D \leq 400$ nm is satisfied.

The negative uniaxial optically anisotropic substance RF of the present invention can be formed from bulk polymer having negative uniaxial property by cutting it obliquely into film-like or plate-like shape so that optical axis is directed to a certain direction with respect to the surface. It is preferable that the film-like or plate-like substance has light transmittance of 80% or more, or more preferably 90% or more.

Intrinsic birefringence of polymer is positive in some cases, and negative in some other cases. To produce a film with negative uniaxial property from such polymer, the film should be compressed in a given direction in case intrinsic birefringence is positive, and the film should be drawn in a given direction in case intrinsic birefringence is negative. In so doing, the refractive index in drawing or compressing direction is smaller than the refractive index in a direction perpendicular to such direction. With this direction as optical axis, the film exhibits negative uniaxial property.

There is no restriction on the polymer which has positive or negative intrinsic birefringence, while the following substances may be used in the present invention:

The polymer with positive intrinsic birefringence include polycarbonate, polyarylate, polyethylene terephthalate, polyether-sulfon, polyphenylene sulfide, polyphenylene oxide, polyallyl-sulfon, polyamide-imide, polyimide, polyolefin, polyacrylonitrile, cellulose, polyester, etc. These include not only monopolymer but also copolymer, their derivatives, or blended mixtures.

The polymers with negative intrinsic birefringence include polystyrene type polymer, acrylic acid ester type polymer, metacrylic acid ester type polymer, acrylonitrile type polymer and metacrylonitrile type polymer.

Here, polystyrene type polymer is defined as homopolymer of styrene and styrene derivatives, copolymer and blended mixture of styrene and styrene derivatives.

Styrene derivatives include, for example, α-methylstyrene, o-methylstyrene, p-methylstyrene, p-chlorostyrene, p-phenylstyrene, 2,5-dichlorostyrene, etc. Copolymer and blended mixture of styrene and styrene derivatives (hereinafter referred as "ST") include, for example, ST/acrylonitrile, ST/metacrylonitrile, ST/methyl metacrylate, ST/ethyl metacrylate, ST/α-chloracrylonitrile, ST/methyl acrylate, ST/ethyl acrylate, ST/butyl acrylate, ST/acrylic acid, ST/metacrylic acid, ST/butadiene, ST/isoprene, ST/maleic acid anhydride, ST/vinyl acetate, copolymer and styrene/styrene derivative copolymer, etc. In addition to a bipolymer as described above, a terpolymer or higher copolymer may be used. The blended mixtures include the blended mixture of the above styrene homopolymer, styrene derivative homopolymer or styrene and styrene derivative copolymer, and also blended mixtures which contain polymer consisting of styrene and styrene derivatives (hereinafter referred as "PST") with polymer not containing PST. One example of such blended mixtures is PST/butylcellulose PST/cumarone resin.

In another method to produce negative uniaxial optically anisotropic substance RF of the present invention, a macromolecular compound is mixed with a low molecular weight liquid crystal and the low molecular weight liquid crystal is oriented and fixed diagonally in a macromolecular matrix. Here, the macromolecular matrix is a substance, which consists of a macromolecular compound and maintains the low molecular weight liquid crystal without contributing to the optical property, i.e., a negative uniaxial property with tilted optical axis as in the present invention.

There is no specific restriction on the low molecular weight liquid crystal used in this method, but it is preferable that it has negative intrinsic birefringence. The following are the structural formulae of some low molecular weight liquid crystals having negative and positive intrinsic birefringence values. Among these, the low molecular weight liquid crystal is without recurring units. Also, the substances used in this method are not limited to these.

TE-1

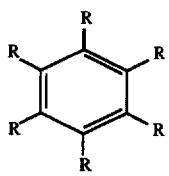

R:

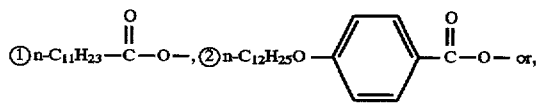

-continued
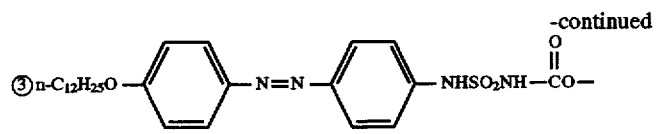
TE-2
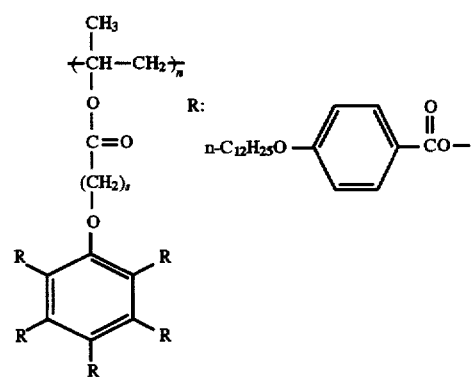
TE-3
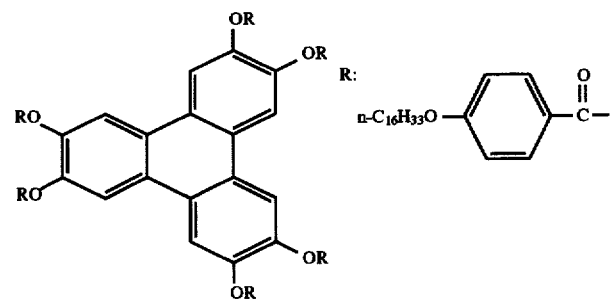
TE-4
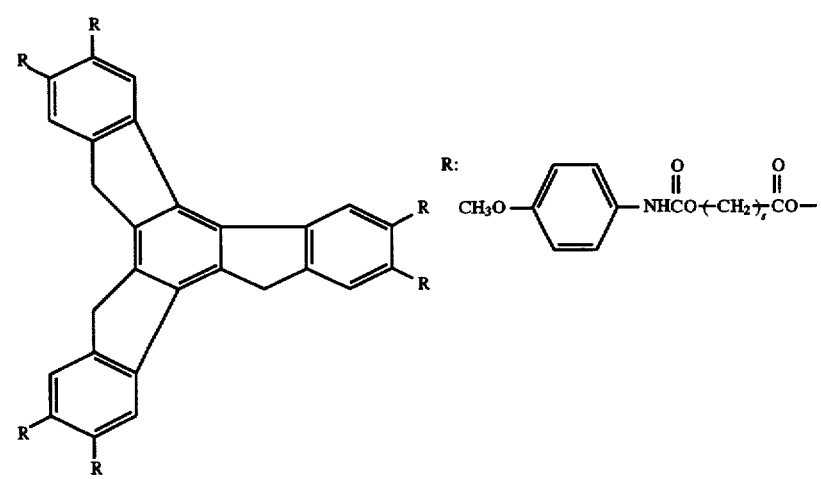
TE-5
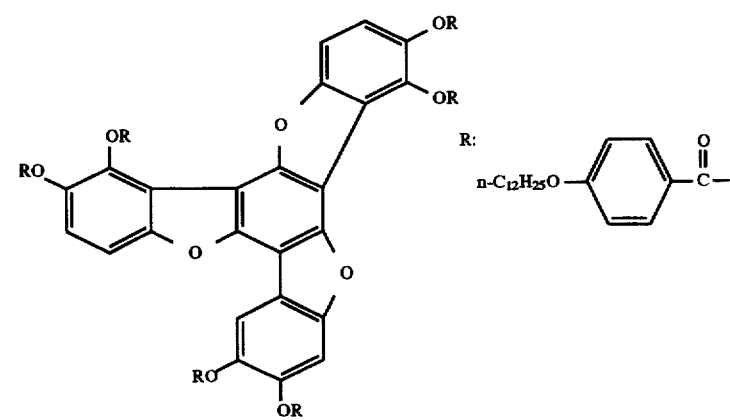

TE-6
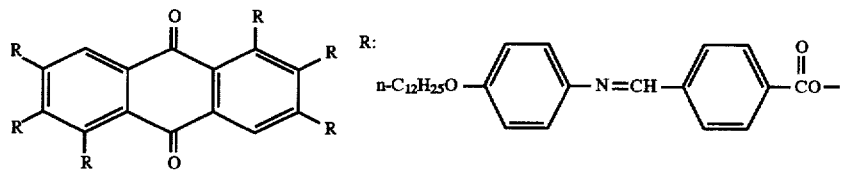
TE-7
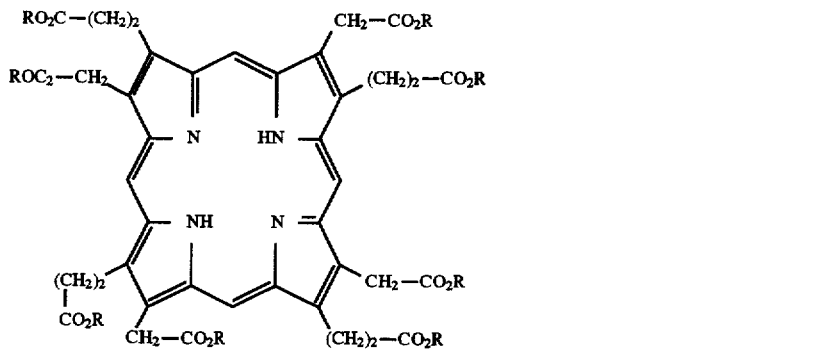
R: n-C₁₂H₂₅—
TE-8
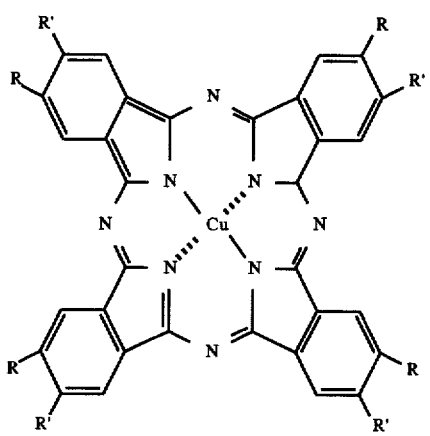
R, R': C₁₂H₂₅OCH₂—
TE-9
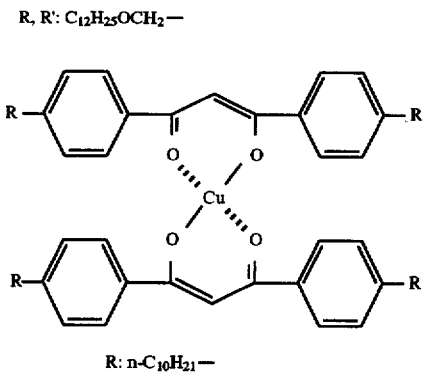
R: n-C₁₀H₂₁—

-continued
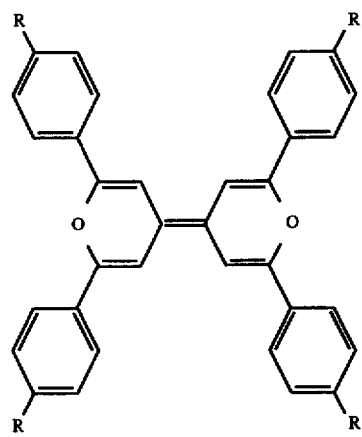
R: n-C$_8$H$_{17}$—
TE-10
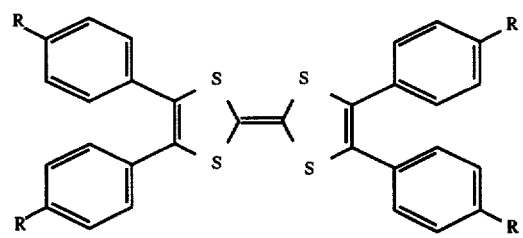
R: n-C$_{16}$H$_{33}$O—
TE-11
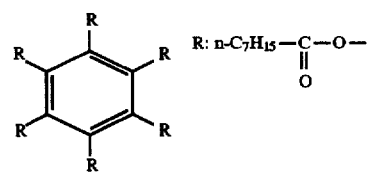  R: n-C$_7$H$_{15}$—C(=O)—O—
TE-12
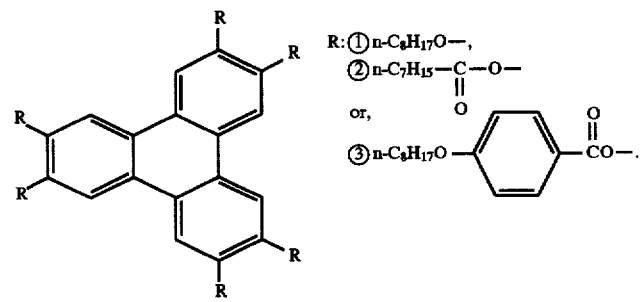
R: ① n-C$_8$H$_{17}$O—,
② n-C$_7$H$_{15}$—C(=O)—O—
or,
③ n-C$_8$H$_{17}$O—C$_6$H$_4$—C(=O)O—.
TE-13
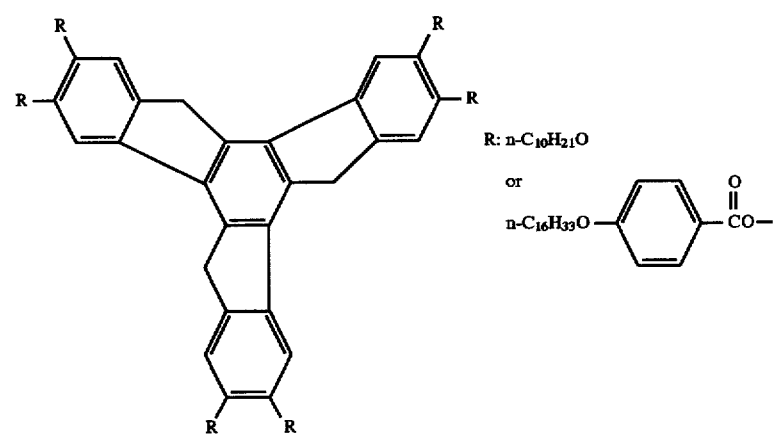
R: n-C$_{10}$H$_{21}$O
or
n-C$_{16}$H$_{33}$O—C$_6$H$_4$—C(=O)O—
TE-14

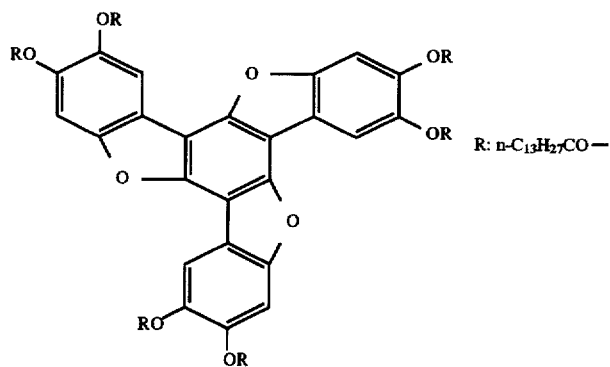
TE-15
R: n-C₁₃H₂₇CO—
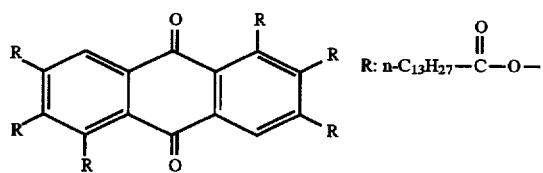
TE-16
R: n-C₁₃H₂₇—C(=O)—O—
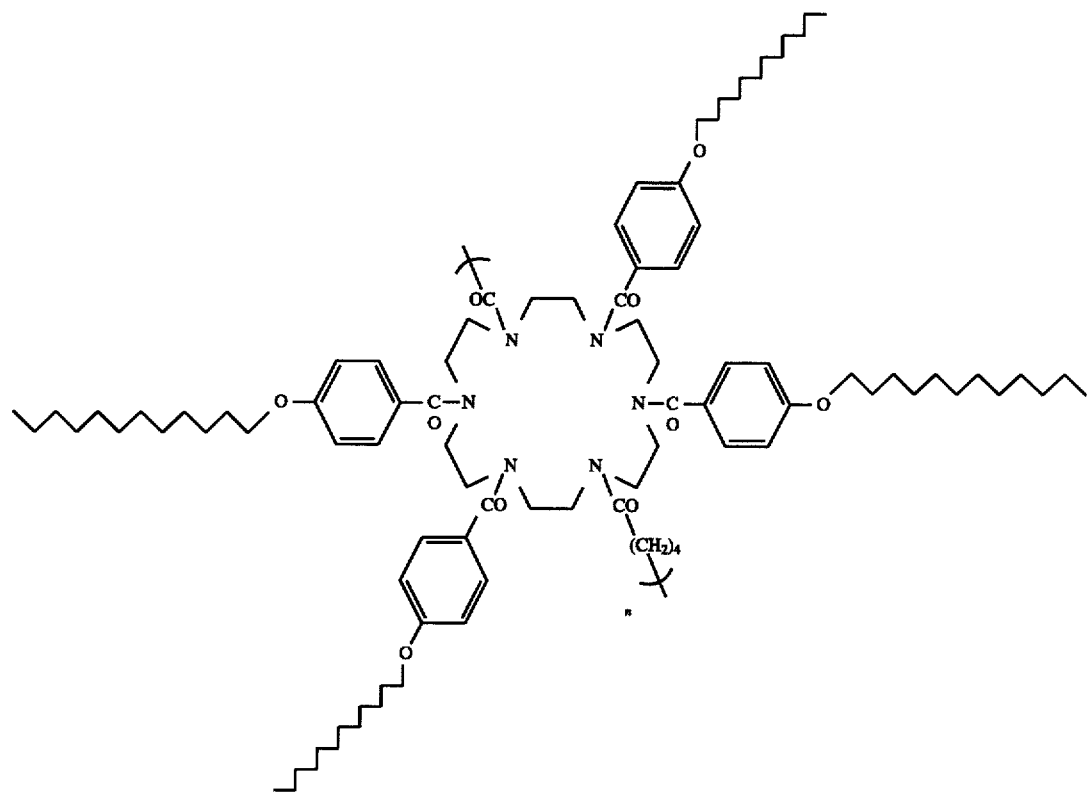
TE-17

TE-18
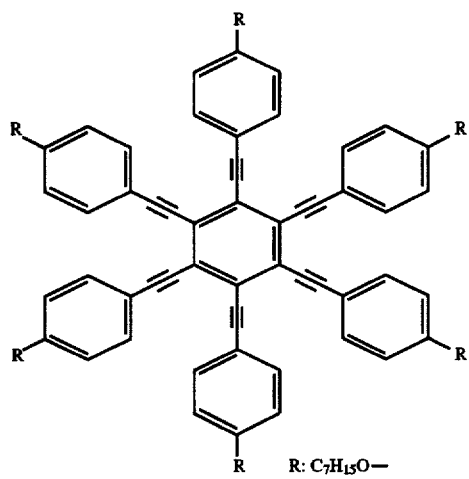
R: C7H15O—
TE-19
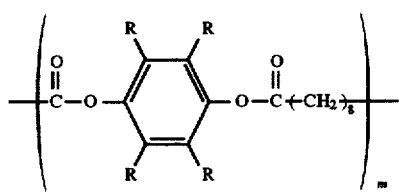
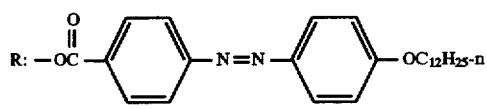
TE-20
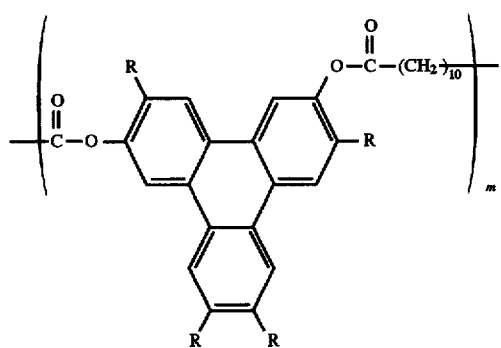
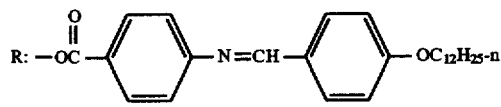
TE-21
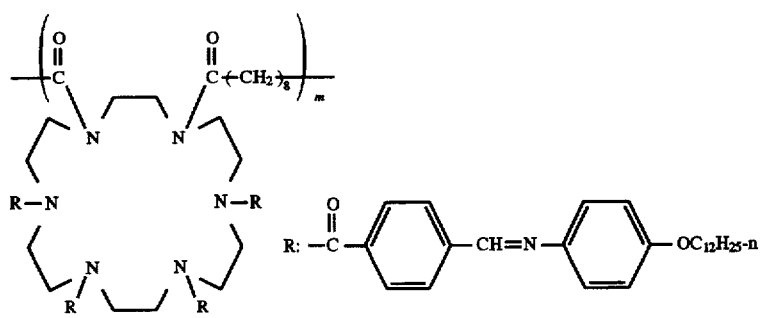

-continued
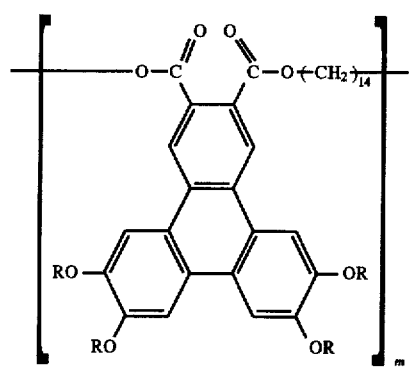
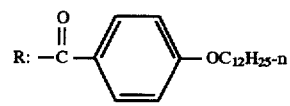
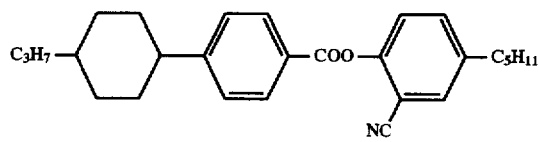 TE-23
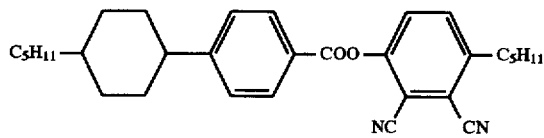 TE-24
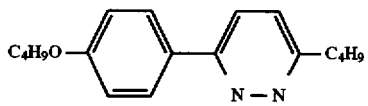 TE-25
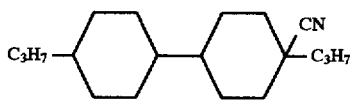 TE-26
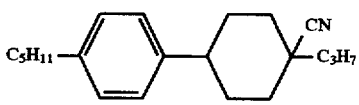 TE-27
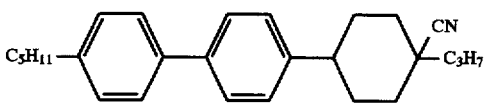 TE-28
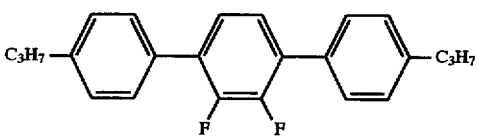 TE-29
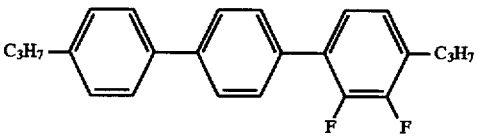 TE-30
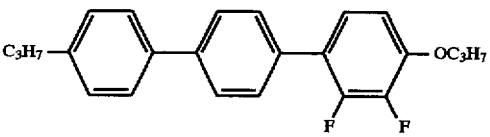 TE-31

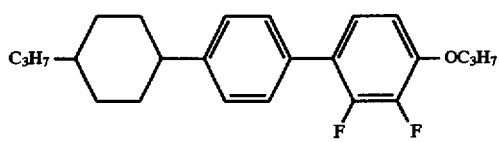

TE-32

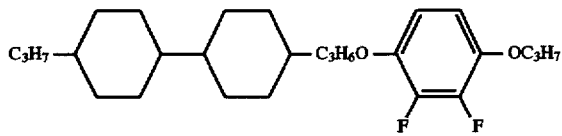

TE-33

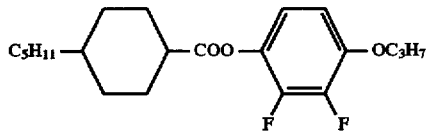

TE-34

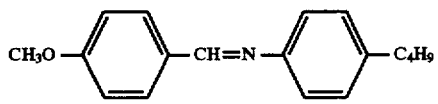

TE-35

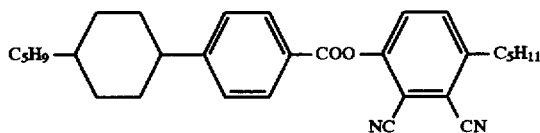

TE-36

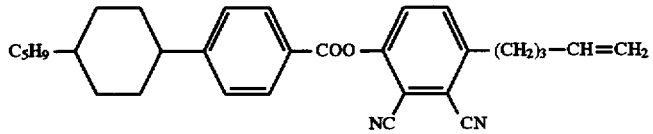

TE-37

For cross-linking between low molecular weight liquid crystals or between a macromolecular compound constituting macromolecular matrix and low molecular weight liquid crystal, it is preferable that there is a reactive substitution group such as a substitution group having an unsaturated bond or a substitution group having active hydrogen at the terminus of the above low molecular weight liquid crystal molecule.

As the means for orienting low molecular weight liquid crystals by the present method, a magnetic field or electric field is used. In particular, as the means for orienting liquid crystals obliquely as in the present invention, it is preferable to use a magnetic field. Specifically, low molecular weight liquid crystal has negative susceptibility anisotropy and shows diamagnetic property. Thus, when a magnetic field is applied from outside, the optical axis of a molecule is oriented in the direction of the magnetic field. Therefore, as schematically illustrated in FIG. 5, when low molecular weight liquid crystal 12 is mixed with macromolecular matrix 11 to disperse the former in the latter and this is coated on a support sheet 10 and external magnetic field 13 is applied at an angle to the direction perpendicular to the surface of the support sheet 10, it is possible to orient the low molecular liquid crystal 12 in that direction. In this case, it is preferable that the magnetic field intensity is 500 G or more, while liquid crystal with lower intrinsic viscosity can be oriented by a magnetic field of less than 500 G. It is preferable that magnetic field vector 13 is inclined by 0° to 60° to the direction perpendicular to the surface of the support sheet 10.

Next, it is preferable that the method to fix the orientation of low molecular weight liquid crystal is performed at the same time as the orienting. More concretely, the methods to fix orientation include a method to add photopolymerization initiator or heat polymerization initiator to a system comprising monomer having unsaturated bond and low molecular weight liquid crystal, to polymerize monomer having unsaturated bond by light or heat while orienting low molecular weight liquid crystal at the same time, and to fix orientation of the low molecular weight liquid crystal; a method to react low molecular weight liquid crystal having a reactive substitution group with macromolecular matrix by heat, light or pH change and to fix the orientation; or a method to fix orientation by cross-linking low molecular weight liquid crystals having a reactive substitution group in the domain of individual liquid crystals. The methods are not limited to these, and various methods known in the art can be employed.

For fixing orientation of liquid crystal, heat polymerization initiator or photopolymerization initiator can be used as described above. As examples of the heat polymerization initiators, there are azo compound, organic peroxide, inorganic peroxide, sulfinic acid, etc. The details on these substances are described in: "Addition Polymerization and Ring Opening Polymerization", compiled by Japanese Society of Macromolecules and Editing Committee of Macromolecular Experimental Sciences; Kyoritu Publishing Co., 1983, pp. 6–18.

As examples of photopolymerization initiators, there are benzophenones, acetophenones, benzoins, thioxanthones, etc. The details of these substances are described in: "UV-Setting System"; Sogo Gijutsu Center [General Technical Center], 1989, pp. 63–147.

There is no specific restriction on the macromolecular compound to be used as the above macromolecular matrix, and the polymer may have positive or negative intrinsic birefringence value, while it is preferable that light transmittance is 60% or more in the state containing low molecular weight liquid crystal and it is substantially transparent and colorless. Also, it is preferable that the macromolecular matrix and low molecular weight liquid crystal are compatible to each other or low molecular weight liquid crystals are dispersed in a size of less than 0.08 μm in macromolecular matrix in order to maintain transparency of the sheet. For dispersal of the low molecular weight liquid crystals, surface active agent, macromolecular compound, etc. may be used as a dispersion supplementary agent.

As macromolecular matrix, the following substances are preferably used: gelatin, agarose, pectin, gum arabic, carrageenin, polyvinyl alcohol, polyvinyl butyral, polymethylvinyl ether, polyhydroxyethyl acrylate, hydroxyethyl cellulose, hydroxypropyl cellulose, methylcellulose, polycarbonate, polyarylate, polysulfon, polyethylene terephthalate, polyethylene naphthalate, polyether sulfon, polyphenylene sulfide, polyphenylene oxide, polyaryl sulfon, polyvinyl alcohol, polyamide, polyimide, polyolefin, polyvinyl chloride, cellulose type polymer, polyacrylonitrile, polystyrene, or bipolymers, terpolymers, graft copolymers, blended products, etc.

Next, description will be given on the method for preparing uniaxial optically anisotropic substance RF containing macromolecular matrix and low molecular weight liquid crystal.

Using a solution containing at least macromolecular compound and low molecular weight liquid crystal, or a solution containing at least macromolecular compound, polymerizable compound and low molecular weight liquid crystal, or a solution containing at least polymerizable compound and low molecular weight liquid crystal, film sheet can be prepared by melt extrusion method, solvent casting method, or calendering method, etc. Or, using glass, plastic film, etc. as a support, the above solution may be coated on the support to produce film sheet. It is preferable to use the coating method because of mechanical strength of uniaxial optically anisotropic substance RF. In this case, there is no restriction on the support to be used, while it is preferable to use the support not soluble in solvent of the coating solution.

At a temperature, in which liquid crystal molecules can move sufficiently in the above film, magnetic field is applied in a direction by 0° to 60° inclined to the direction perpendicular to the surface of the film sheet, and cross-linking is performed between macromolecular compound and low molecular weight liquid crystal or between low molecular weight liquid crystals. In so doing, it is possible to fix the orientation of the liquid crystals and to obtain the desired uniaxial optically anisotropic substance.

Another method to produce negative uniaxial optically anisotropic substance RF of the present invention is to cast or coat liquid crystal macromolecules on a substrate with homeotropic orientation or inclined orientation and to adjust the orientation by applying an electric field or magnetic field.

As schematically illustrated in FIG. 6, this method is to perform homeotropic orientation or inclined orientation 14 on a support sheet 10. A solution containing a transparent macromolecule having film forming ability, if necessary, and liquid crystal macromolecule having negative intrinsic birefringence value is casted or coated, and the liquid crystal macromolecules in the solution 15 are oriented in a direction at an angle to a direction perpendicular to the surface of the support sheet 10.

There is no specific restriction on the transparent macromolecule having film forming ability. It is preferable to use gelatin, alginic acid, pectin, carrageenin, polycarbonate, polyarylate, polysulfon, polyethylene terephthalate, polyether sulfon, polyphenylene sulfide, polyphenylene oxide, polyaryl sulfon, polyvinyl alcohol, polyamide, polyimide, polyolefin, polyvinyl chloride, cellulose polymer, polyacrylonitrile, polystyrene, bipolymer, terpolymer, blended products, etc.

The liquid crystal macromolecule used here has recurring units in the molecule. There is no restriction to the recurring units, but it is preferable that there are 10 or more recurring units, or more preferably, 10 or more and 10,000 or less recurring units. It is preferable that it has a negative intrinsic birefringence value. The details on this substance are described in "Liquid Crystals, 1989, Vol. 5, No. 1, pp. 159–170".

For fixing orientation, it is preferable that there is a reactive substitution group such as a substitution group having unsaturated bond or active hydrogen at the terminus of the above low molecular weight liquid crystal for crosslinking between low molecular liquid crystals or between macromolecular matrix and low molecular weight liquid crystal.

Liquid crystal macromolecule can be roughly divided into main chain type and side chain type, depending upon the position of the mesogen group. It can also be divided into thermotropic and lyotropic. There is no restriction on the transparent liquid crystalline macromolecule, while it is preferable that it can form nematic liquid crystal. Side chain type is preferable from the viewpoint of orientation, and the thermotropic type is preferable from the viewpoint of orientation fixing. As the skeleton used in side chain type liquid crystalline macromolecule, it is preferable to use vinyl type polymer, polysiloxane, polypeptide, polyphosphagen, polyethyleneimine, cellulose, etc.

Next, a description will be given on homeotropic orientation or inclined orientation processing 14. For homeotropic orientation processing, a material having low surface energy, i.e. high water-repellent property, is used. As such materials, silane compound disclosed in Japanese Patent Laid-Open Publications 58-72923, 58-88723, 2-3017, etc. may be preferably used. For the inclined orientation processing, a method to perform vacuum deposition of silicon oxide, gold, etc. from oblique direction or a method to perform homeotropic orientation after oblique deposition, or a method to combine with rubbing method after homeotropic orientation disclosed in Japanese Patent Laid-Open Publications 62-270917, 2-37323, etc. may be used.

Because the effect of the orientation processing on the support sheet is insufficient in case thickness of negative uniaxial optically anisotropic substance is 10 μm or more, it is preferable to apply magnetic field or electric field from a certain direction, which is neither in parallel nor perpendicular to the substrate.

Next, the method for fixing orientation of liquid crystal molecules is described. After low molecular weight or macromolecular liquid crystal is formed at higher than room temperature, or more preferably at 100° C. or more and it is oriented by orientation processing on the substrate or by magnetic field or electric field, it is quickly cooled down to room temperature to fix orientation. Further, as the methods to fix orientation positively, there are a method to add photopolymerization initiator or heat polymerization initiator to a system containing monomer having unsaturated bond and low molecular weight or macromolecular liquid crystal, to polymerize the monomer having unsaturated bond by heat while orienting the liquid crystal and to fix orientation of the liquid crystal, a method to react low molecular weight liquid crystal having reactive substitution group with macromolecular matrix by heat, light or pH change to fix the orientation, or a method to fix orientation by cross-linking low molecular weight liquid crystals having reactive substitution groups within the domain of each individual liquid crystal. The methods are, however, not limited to these, and any method known in the art can be employed.

For fixing orientation of liquid crystal in the present method, heat polymerization initiator or photopolymerization initiator can be employed as described above. As examples of the heat polymerization initiator, there are azo compound, organic peroxide, inorganic peroxide, sulfinic acids, etc.

The details on these substances are described in: "Addition Polymerization and Ring Opening Polymerization", compiled by Japanese Society of Macromolecules and Editing Committee of Macromolecular Experimental Sciences; Kyoritu Publishing Co., 1983, pp. 6–18.

As examples of photopolymerization initiators, there are benzophenones, acetophenones, benzoins, thioxanthones, etc. The details of these substances are described in: "UV-Setting System"; Sogo Gijutsu Center [General Technical Center], 1989, pp. 63–147 Next, description will be given on the method for preparing uniaxial optically anisotropic substance RF containing liquid crystalline molecule. Using a solution containing at least transparent macromolecule having film forming ability and low molecular weight liquid crystal, or a solution containing at least transparent liquid crystalline macromolecule, film sheet can be prepared by melt extrusion method, solvent casting method on substrate. Or, using glass, plastic film, etc. as a support, the above solution can be coated on the support to prepare the film sheet. It is preferable to use the coating method from the viewpoint of mechanical strength of optically anisotropic substance RF and productivity. In this case, there is no restriction on the support to be used, while it is preferable that it is not soluble in solvent of the coating solution.

As another method for producing negative uniaxial optically anisotropic substance RF of the present invention, there is a method to apply shearing force difference on film between heating rolls having different peripheral speeds. There is no restriction on 3-axial refractive index of the film before shearing force is applied, and it may be optically isotropic or non-isotropic. However, in case the film is optically isotropic before shearing force is applied, it is necessary to apply process of uniaxial stretching or biaxial stretching in a direction perpendicular to shearing direction, i.e. in lateral direction, before or after applying shearing force in order to provide negative uniaxial property. With regard to the percent of stretch in longitudinal and lateral directions of biaxial stretching in this case, it is preferable that the percent of stretch in lateral direction is slightly higher. Either the process to apply shearing force or the process to stretch in the perpendicular direction may be performed first, and there is no need that these are performed continuously. In case 3-axial refractive index characteristics satisfies the relationship $n_{TD} > n_{MD}$ (where $n_{TD}$ is refractive index in lateral direction of the film, and $n_{MD}$ is refractive index in longitudinal direction of the film), the object of the present invention can be accomplished by simply applying shearing deformation, thereby omitting stretching process in longitudinal direction.

To apply shearing force difference on the two sides of the film, it is heated to a temperature closer to glass transition temperature Tg of the polymer, which constitutes the film, or to a temperature suitable for thermal deformation and higher than Tg. Then, the film F is squeezed between two rotating rolls 1 and 2 having different peripheral speeds of $V_1$ and $V_2$ or to move the film in reverse direction as shown in FIG. 8, and the film F is pulled out in the direction shown by double arrow. (In FIG. 8, the rolls 1 and 2 are rotated respectively in the direction of arrow with relationship $V_1 > V_2$.) The possibility to incline the direction of main refractive index $n_{ND}$ by shearing force difference can be attained because of distorsion, as shown in FIG. 8 as deformation of an imaginary cube (a→b→c) in the film F is applied on the interior of the film F. In FIG. 8, the imaginary cube "a" in the film F is deformed by the difference of peripheral speeds of the two rolls 1 and 2 and is deformed to a rhombus "b", and further to a rhombus "c" and is delivered. In this case, the molecules in the cube are also inclined, and the direction of main refractive index $n_{ND}$ is also inclined from the direction perpendicular to the film F.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

In the following, the features of the present invention will be described in connection with embodiments.

DESCRIPTION OF THE PREFERRED EMBODIMENTS

Figure 1:
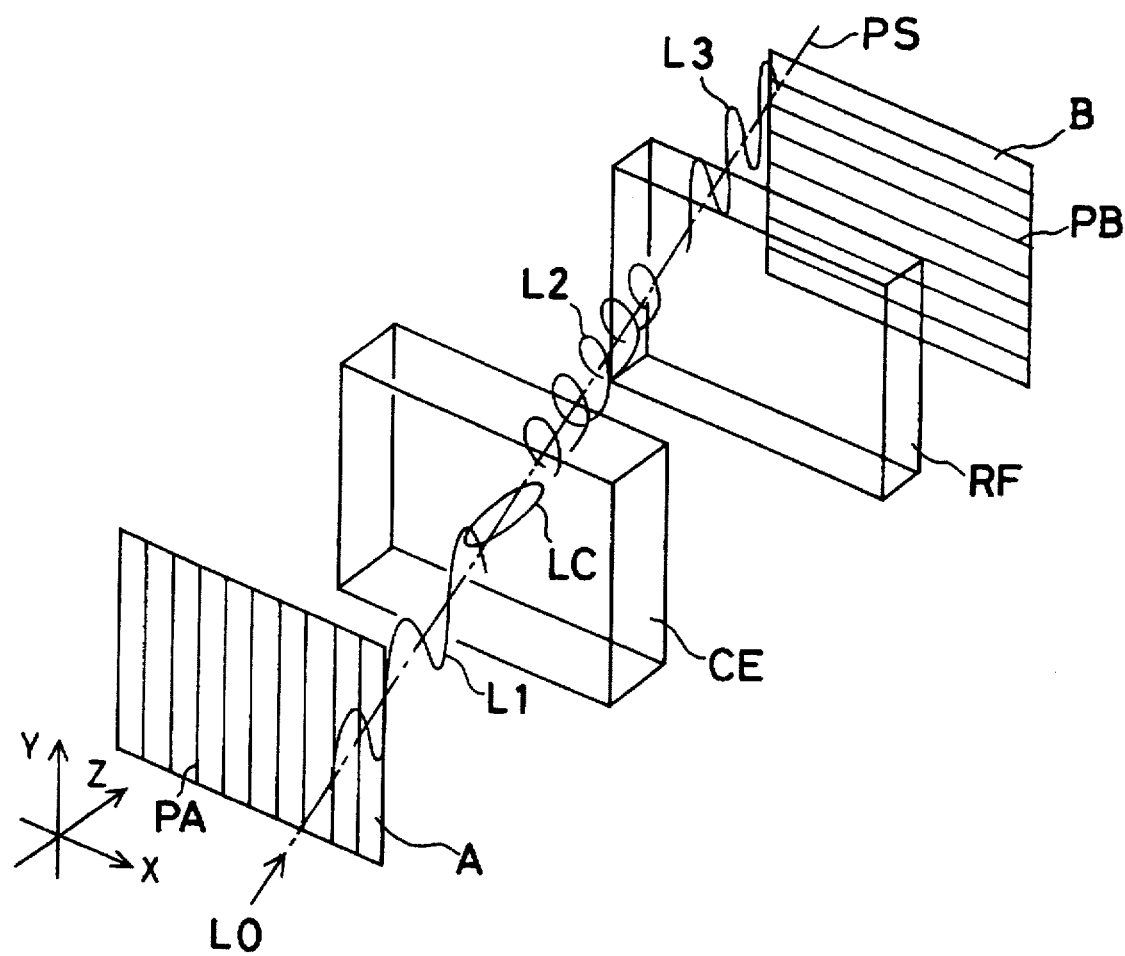
FIG. 1 is a drawing for explaining an example of configuration of a liquid crystal display element using an optically anisotropic element of the present invention.
Figure 2:
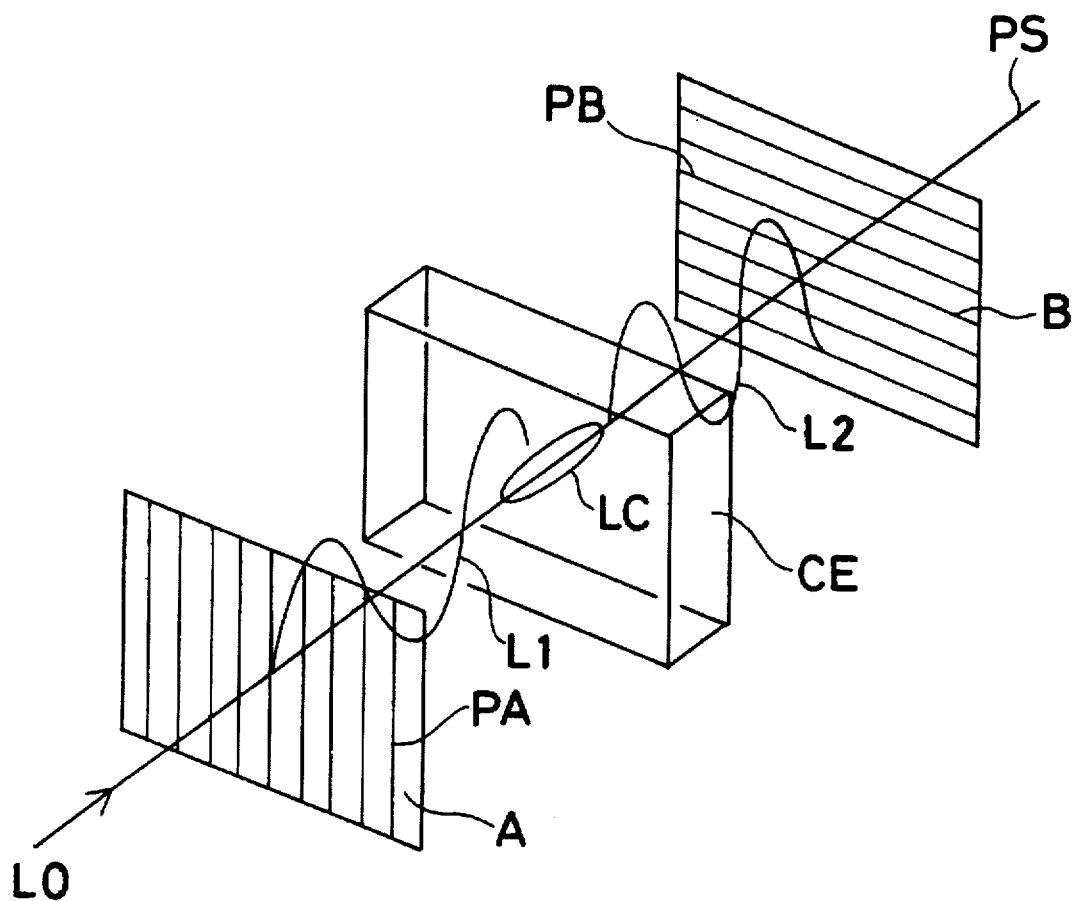
FIG. 2 is a drawing for explaining configuration of a conventional TN type liquid crystal display element and light transmission in case light enters perpendicularly to the display surface.
Figure 3:
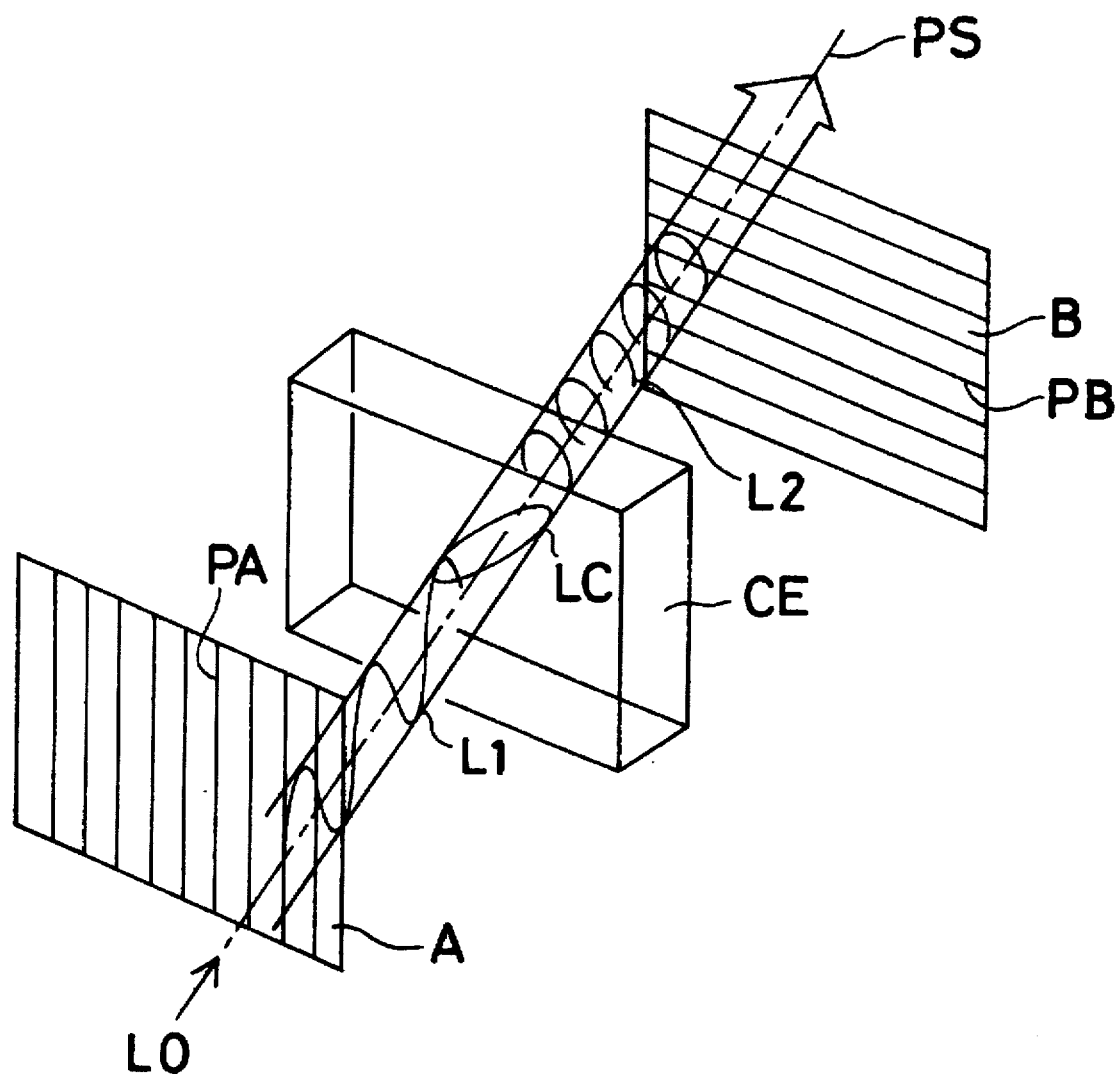
FIG. 3 is a drawing for explaining transmission of light when light enters obliquely to display surface of the conventional TN type liquid crystal display element.
Figure 4A:
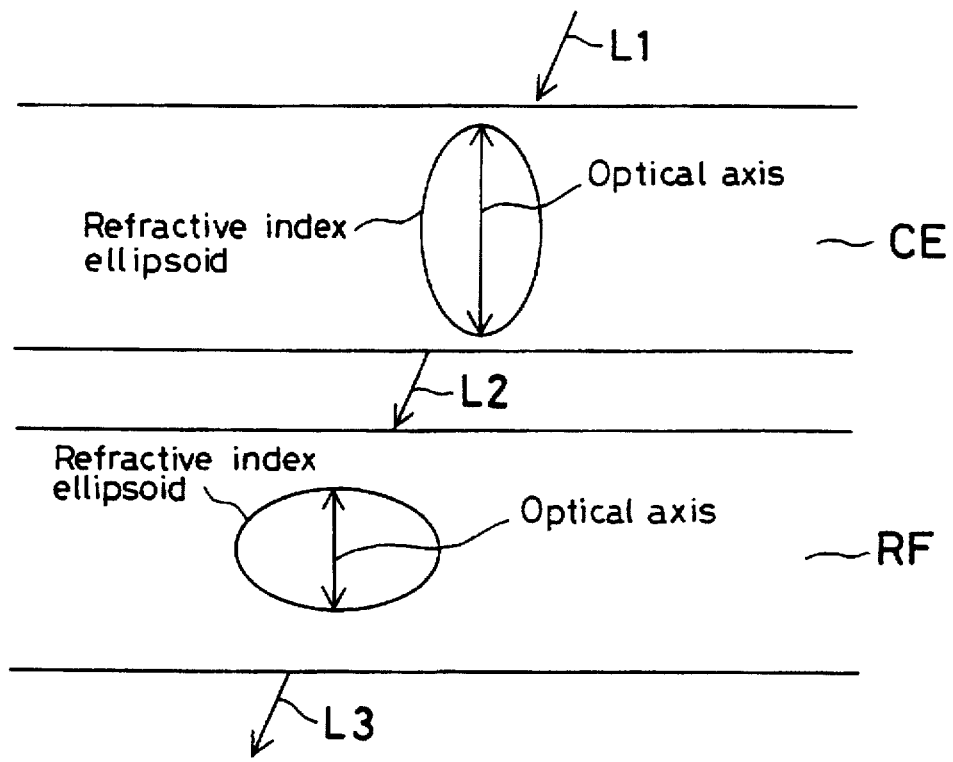
FIGS. 4(a)–(b) show the relationship between direction of optical axis of a negative uniaxial optically anisotropic element and optical axis of a liquid crystal cell.
Figure 4B:
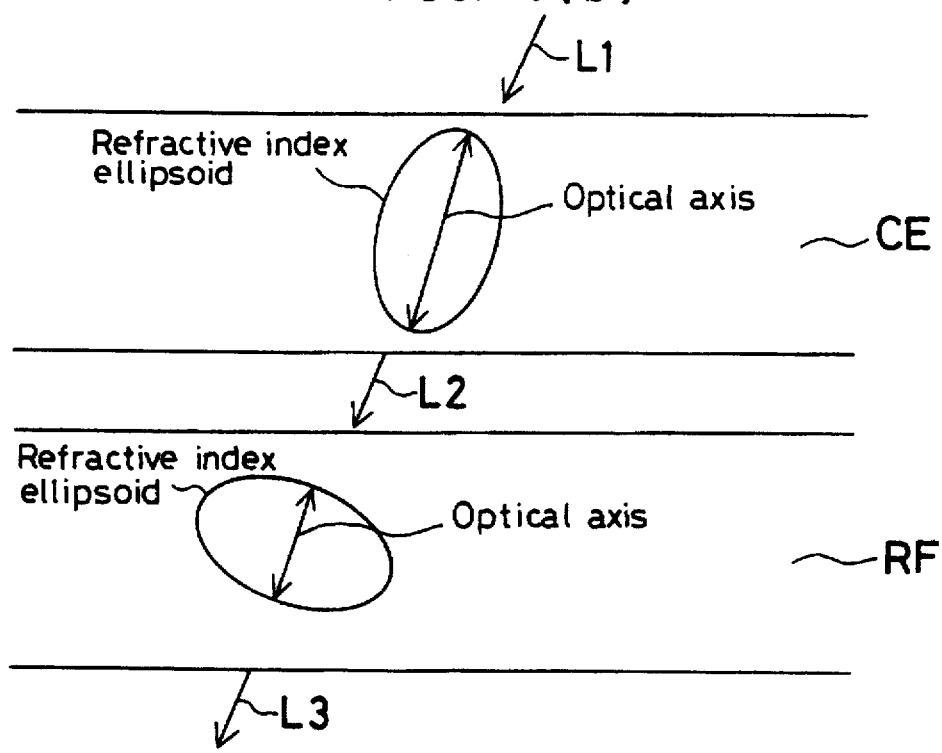
Figure 5:
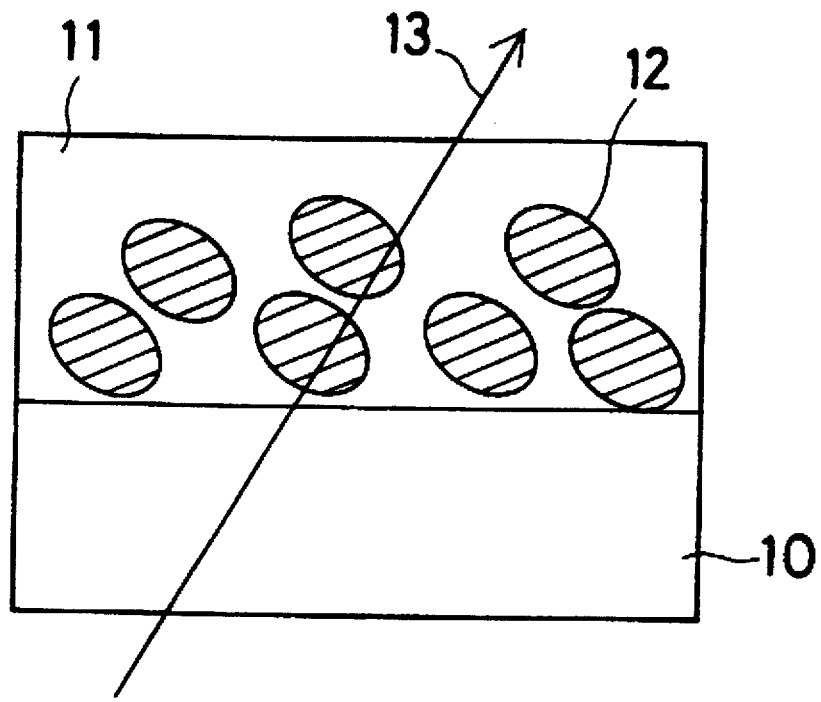
FIG. 5 schematically illustrates a method for orienting liquid crystal molecules by magnetic field.
Figure 6:
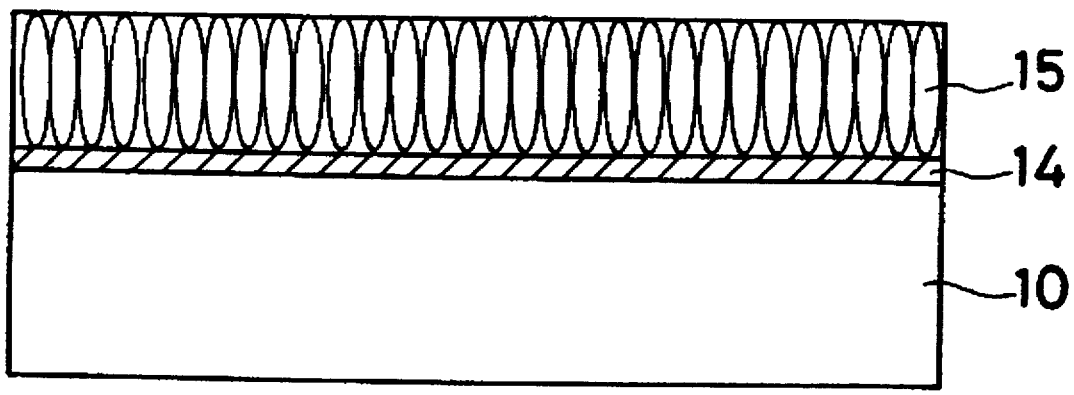
FIG. 6 is a schematical illustration for explaining a method for orienting liquid crystalline macromolecule by homeotropic orientation or inclined orientation processing.

In the following, description will be given on an optically anisotropic element of the present invention and a method for manufacturing the same in connection with several embodiments.

[Embodiment 1]

(EXAMPLE 1A)

By melting a pellet of styrene-acrylonitrile copolymer with molecular weight of 150,000, and by extruding it through nozzle having inner diameter of 100 mm and stretching it by 30%, a rod of styrene-acrylonitrile copolymer with outer dimension of 87 mm was obtained. Along a plane, which crosses a plane perpendicular to central axis, i.e. stretching axis, of this rod at an angle of 20°, this rod was sliced, and a plate material of elliptical shape with thickness of about 1.5 mm was prepared.

This plate material was sequentially polished by a lapping machine (Buehler; U.S.A.) with SiC powder of 50 µm, SiC powder of 30 µm, Sic powder of 10 µm, diamond powder of 3 µm, and alumina powder of 0.05 µm, and a plate of styrene-acrylonitrile with mirror surface and with thickness of 1.0 mm was prepared.

(EXAMPLE 1B)

A mirror surface styrene-acrylonitrile plate with thickness of 1.0 mm was prepared by the same procedure as in the Example 1A, except that it was sliced along a plane, which crosses the plane perpendicular to the stretching axis at an angle of 10°.

(EXAMPLE 1C)

A mirror surface styrene-acrylonitrile plate with thickness of 1.0 mm was prepared by the same procedure as in the Example 1A, except that it was sliced along a plane, which crosses the plane perpendicular to the stretching axis at an angle of 30°.

(EXAMPLE 1D)

A mirror surface styrene-acrylonitrile plate with thickness of 1.0 mm was prepared by the same procedure as in the Example 1A, except that it was sliced along a plane, which crosses the plane perpendicular to the stretching axis at an angle of 40°.

(Comparative example 1A)

The rod obtained in Example 1A was sliced along a plane, which crosses perpendicularly the central axis, i.e. stretching axis, of the rod, and a disk with thickness of about 1.5 mm was prepared. This disk was polished by the same procedure as in Example 1A, and a mirror surface styrene-acrylonitrile plate with thickness of 1.0 mm was obtained.

(Comparative example 1B)

A mirror surface styrene-acrylonitrile plate with thickness of 1.0 mm was prepared by the same procedure as in Example 1A, except that it was sliced along a plane, which crosses the plane perpendicular to the stretching axis at an angle of 50°.

[Determination of an angle formed by optical axis and normal line and also of refractive index $n_0$ in a direction perpendicular to optical axis, and refractive index $n_0$ in direction of optical axis]

Optical axis as well as $n_0$ and $n_e$ were determined on plate materials, which were prepared in Examples 1A to 1D and Comparative examples 1A to 1B.

For the measurement, ellipsometer AEP-100 (Shimadzu Corporation) was used in transmission mode. Each of the plate materials prepared in Examples and Comparative examples were attached to a goniometer placed between λ/4 plate and analyzer of the ellipsometer AEP-100. By rotating the plate material, optical axis was determined in the direction where birefringence is free. The results are shown in Table 1.

TABLE 1

| Plate material | Angle between optical axis and normal line | $n_e - n_0$ |
|---|---|---|
| Example 1A | 20° | −0.0003 |
| Example 1B | 10° | −0.0003 |
| Example 1C | 30° | −0.0003 |
| Example 1D | 40° | −0.0003 |
| Comparative example 1A | 0° | −0.0003 |
| Comparative example 1B | 50° | −0.0003 |

From the change of retardation (product of bire-fringence value and thickness) when the plate material was further rotated from the optical axis, the difference between $n_e$ and $n_0$ was calculated. The results are shown in Table 1.

[Optical arrangement of liquid crystal display element]

Next, the optically anisotropic element RF was removed in FIG. 1, and TN liquid crystal cell CE was arranged in such manner that rubbing axis on the polarizing plate A side is at 45° within X-Y plane with respect to X-axis and the rubbing axis on the polarizing plate B side is at 135° with respect to X-axis, and that polarizing axis PA of the polarizing plate A is at 45° to X-axis and polarizing axis PB of the polarizing plate B is at 135° to X-axis. The retardation value, i.e. $(n_e-n_0) \times$gap size, of the liquid crystal cell CE used here was 480 nm, and gap size was 5.0 µm.

Figure 7:
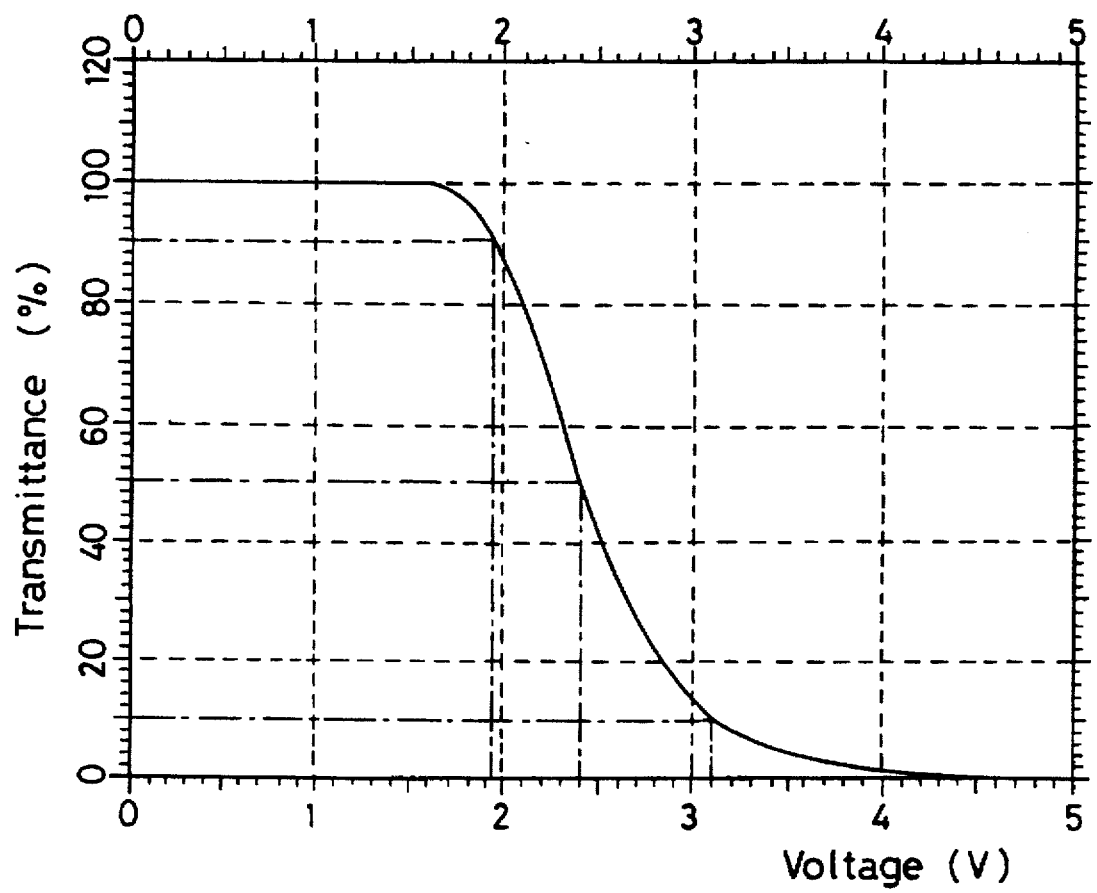
FIG. 7 is a diagram showing applied voltage characteristics of transmission light of a liquid crystal display element used in an embodiment of the present invention.
Figure 8:
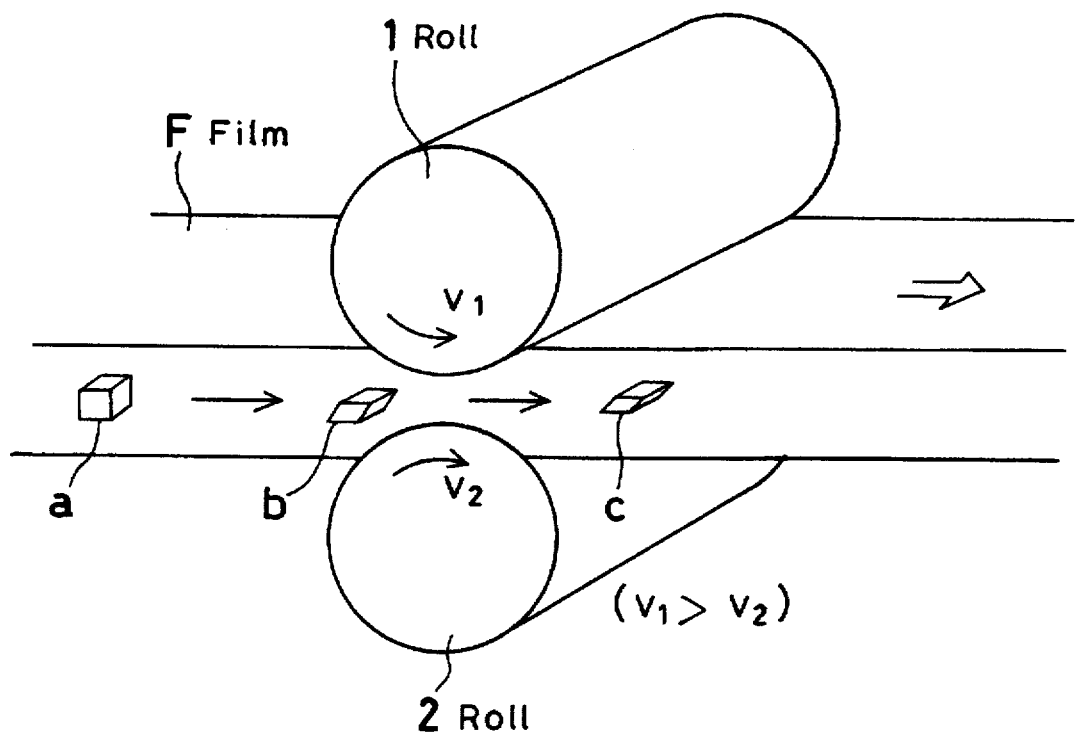
FIG. 8 is a drawing for explaining an arrangement to provide shearing force difference and a mechanism to incline optical axis of the present invention.

Voltage with rectangular wave of 30 Hz was applied on the liquid crystal cell CE, and the relationship between transmittance and voltage was determined by LCD-5000 (Otsuka Electronics Co., Ltd.). The results are given in FIG. 7. Here, light transmittance when voltage is not applied was assumed as 100%. [Evaluation of visual angle characteristics]

(EXAMPLE 1E)

The optically anisotropic element RF was disposed as shown in FIG. 1, and the other arrangement was the same as in the optical arrangement as described above. As the optically anisotropic element RF, the styrene-acrylonitrile plate prepared in Example 1A was used, and visual angle characteristics (upper, lower, left and right) of 0V/5V contrast 10 standard were measured by LCD-5000 (Otsuka Electronics Co., Ltd.).

(EXAMPLE 1F)

In an optical system similar to that of Example 1E, the styrene-acrylonitrile plate prepared in Example 1B was used as the optically anisotropic element RF, and visual angle characteristics (upper, lower, left and right) of the same contrast 10 standard were obtained.

(EXAMPLE 1G)

In an optical system similar to that of Example 1E, the styrene-acrylonitrile plate prepared in Example 1C was used as the optically anisotropic element RF, and visual angle characteristics (upper, lower, left and right) of the same contrast 10 standard were obtained.

(EXAMPLE 1H)

In an optical system similar to that of Example 1E, the styrene-acrylonitrile plate prepared in Example 1D was used as the optically anisotropic element RF, and visual angle characteristics (upper, lower, left and right) of the same contrast 10 standard were obtained.

(Comparative example 1C)

In an optical system similar to that of Example 1E, visual angle characteristics (upper, lower, left and right) of 0V/5V contrast 10 standard were obtained without the optically anisotropic element RF. (Comparative example 1D)

In an optical system similar to that of Example 1E, the styrene-acrylonitrile plate prepared in Comparative example 1A as the optically anisotropic element RF, and visual angle characteristics (upper, lower, left and right) on the same contrast 10 standard were obtained.

(Comparative example 1E)

In an optical system similar to that of Example 1E, the styrene-acrylonitrile plate prepared in Comparative example 1B was used as the optically anisotropic element RF, and visual angle characteristics (upper, lower, left and right) of the same contrast 10 standard were obtained.

Table 2 shows visual angles (upper, lower, left and right) of the contrast 10 standard as obtained by the experiments in Examples 1E to 1H and Comparative examples 1C to 1E.

TABLE 2

|  | Upper | Lower | Left | Right |
|---|---|---|---|---|
| Example 1E | 56° | 45° | 55° | 50° |
| Example 1F | 47° | 37° | 34° | 39° |
| Example 1G | 44° | 35° | 40° | 38° |
| Example 1H | 35° | 38° | 35° | 39° |
| Comparative example 1C | 29° | 18° | 33° | 36° |
| Comparative example 1D | 20° | 12° | 23° | 60° |
| Comparative example 1E | 20° | 40° | 36° | 39° |

[Embodiment 2]

(EXAMPLE 2A)

Low molecular weight liquid crystal (TE-3) by 33 wt %, polymethyl metacrylate by 47 wt %, acetoxybenzophenone by 2 wt %, and acrylic polymerizable compound by 18 wt % were mixed together, and the mixture was dissolved in methylene chloride to prepare a liquid crystal solution (SE-1). After SE-1 was coated on polyethylene terephthalate film, magnetic field was applied in a direction inclined by 15° from a direction perpendicular to sheet surface in an atmosphere kept at 90° C., and light was irradiated from a xenon lamp, and an optically anisotropic element (KH-1) was prepared.

(EXAMPLE 2B)

Low molecular weight liquid crystal (TE-4) by 33 wt %, polyvinylbutyral by 47 wt %, and acrylic polymer having aryl group in side chain by 20 wt % were mixed, and the mixture was dissolved in chloroform to prepare a liquid crystal solution (SE-2). After coating SE-2 on polyethylene terephthalate film, magnetic field was applied in a direction inclined by 38° from a direction perpendicular to sheet surface in an atmosphere kept at 100° C., and light was irradiated from xenon lamp, and an optically anisotropic element (KH-2) was prepared.

(EXAMPLE 2C)

Low molecular weight liquid crystal (TE-12) and acrylic polymerizable compound used in Example 2A above were mixed together at a ratio of 3:2. After adding acetoxybenzophenone to this by 1 wt %, this was dispersed by homogenizer into 30% aqueous solution of polyvinyl alcohol, and a liquid crystal solution (SE-3) was prepared. After coating SE-3 on polyethylene terephthalate film, magnetic field was applied in a direction inclined by 28° from the direction perpendicular to sheet surface in an atmosphere kept at 110° C., and light was irradiated from xenon lamp, and an optically anisotropic element (KH-3) was prepared.

(Comparative example 2A)

The same low molecular weight liquid crystal as in Example 2B by 33 wt %, polyvinylbutyral by 47 wt %, and acrylic polymer having aryl group in side chain by 20 wt % were mixed together, and the mixture was dissolved in chloroform to prepare a liquid crystal solution (SE-2). After coating SE-2 on polyethylene terephthalate film, magnetic field was applied perpendicularly to sheet surface in an atmosphere kept at 100° C., and by irradiating light from xenon lamp, an optically anisotropic element (KH-4) was prepared.

(Comparative example 2B)

The same low molecular weight liquid crystal as used in Example 2A by 33 wt %, polymethyl metacrylate by 47 wt %, acetoxybenzophenone by 2 wt %, and acrylic polymerizable compound by 18 wt % were mixed together, and this mixture was dissolved in methylene chloride to prepare a liquid crystal solution (SE-1). By coating SE-1 on polyethylene terephthalate film, an optically anisotropic element (KH-5) was prepared.

[Measurement of optical axis]

On the optically anisotropic elements prepared in Examples 2A to 2C and Comparative examples 2A to 2B, the angle between optical axis and normal line as well as $n_e$ and $n_0$ were determined by the same procedure as in Embodiment 1. The results are given in Table 3.

TABLE 3

| | Optically anisotropic element | Angle between optical axis and normal line | $n_e - n_0$ | Thickness of optically anisotropic element (μm) |
|---|---|---|---|---|
| Example 2A | KH-1 | 16° | −0.007 | 50 |
| Example 2B | KH-2 | 35° | −0.004 | 37 |
| Example 2C | KH-3 | 23° | −0.006 | 60 |
| Comparative example 2A | KH-4 | 0° | −0.006 | 55 |
| Comparative example 2B | KH-5 | No optical axis because of isotropy | 0 | 65 |

[Evaluation of visual angle characteristics]

Using the optically anisotropic elements prepared in Examples 2A to 2C and Comparative examples 2A to 2B as the optically anisotropic element RF shown in FIG. 1, visual angle characteristics (upper, lower, left and right) of 0V/5V contrast 10 standard were obtained in the optical arrangement of liquid crystal display element as in Embodiment 1. The results are summarized in Table 4.

TABLE 4

|  | Optical aniso-tropic element | Upper–Lower | Left–Right |
|---|---|---|---|
| Example 2A | KH-1 | 50°–43° | 52°–45° |
| Example 2B | KH-2 | 45°–41° | 42°–40° |
| Example 2C | KH-3 | 55°–47° | 50°–45° |
| Comparative example 2A | KH-4 | 20°–18° | 34°–39° |
| Comparative example 2B | KH-5 | 29°–17° | 31°–30° |
|  | None | 29°–18° | 33°–36° |

[Embodiment 3]

(EXAMPLE 3A)

Macromolecular liquid crystal (TE-2) was dissolved in methylene chloride, and 10 wt % macromolecular liquid crystal solution (SE-4) was prepared. On a glass substrate, 3% isopropanol solution of octadecyltriethoxysilane was coated, and after baking at 100° C. for 30 minutes, ethanol was washed out. After baking again at 100° C. for 30 minutes, rubbing processing was performed with flocked cloth. After orientation processing, the macromolecular liquid crystal solution (SE-4) was coated on said glass substrate, and an optically anisotropic element (KH-6) was prepared.

(Comparative example 3A)

The macromolecular liquid crystal solution (SE-4) of Example 3A was coated by the same procedure on a glass substrate without orientation processing, and an optically anisotropic element (KH-7) was prepared. [Measurement of optical axis]

On the optically anisotropic elements prepared in Example 3A and Comparative example 3A, the angle between optical axis and normal line as well as $n_e$ and $n_0$ were determined by the same procedure as in Embodiment 1. The results are shown in Table 5.

TABLE 5

|  | Optically aniso-tropic element | Angle between optical axis and normal line | $n_e - n_0$ | Thickness of optically anisotropic element (μm) |
|---|---|---|---|---|
| Example 3A | KH-6 | 21° | –0.005 | 72 |
| Comparative example 3A | KH-7 | No optical axis because of isotropy | 0 | 30 |

[Evaluation of visual angle characteristics]

Using the optically anisotropic elements prepared in Example 3A and Comparative example 3A as the optically anisotropic element RF shown in FIG. 1, visual angle characteristics (upper, lower, left and right) of 0V/5V contrast 10 standard were obtained in an optical arrangement of the liquid crystal display element similar to that of the Embodiment 1. The results are given in Table 6.

TABLE 6

|  | Optically aniso-tropic element | Upper–Lower | Left–Right |
|---|---|---|---|
| Example 3A | KH-6 | 52°–43° | 42°–40° |
| Comparative example 3A | KH-7 | 20°–37° | 34°–39° |
|  | none | 29°–18° | 33°–36° |

[Embodiment 4]

(EXAMPLE 4A)

By condensation of phosgene with bisphenol A, polycarbonate with weight average molecular weight (converted to styrene) of 30,000 was obtained, and this was dissolved in methylene dichloride to prepare 20% solution. This was cast on a steel drum and was continuously stripped and dried, and a film (F-1) of 15 cm in width and 120 μm in thickness was obtained. This film was squeezed between rolls $R_4$ and $R_5$ with different peripheral speeds, and 200 m of film (F-2) was prepared in shape of roll.

Figure 9:
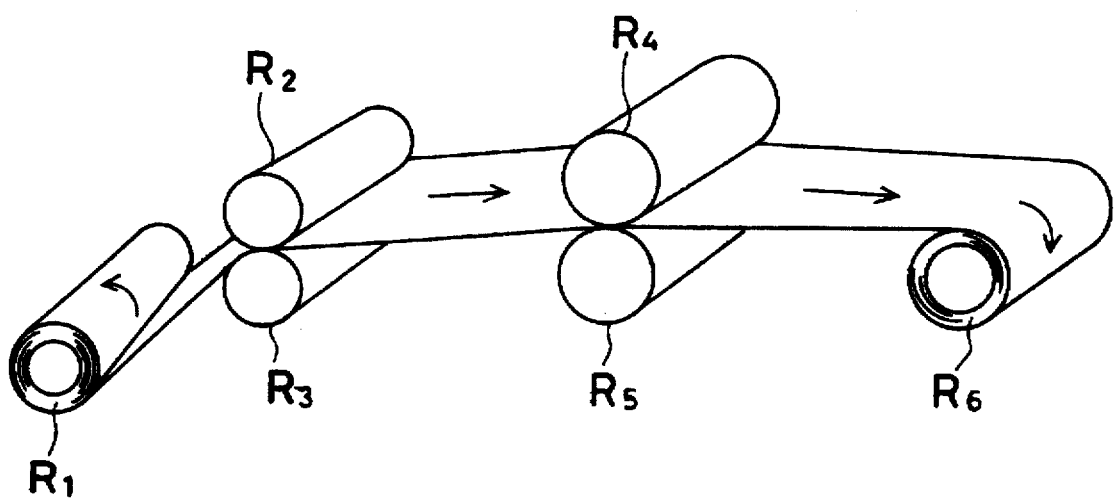
FIG. 9 shows an arrangement of rolls with different peripheral speeds for executing the manufacturing method of the present invention.

In FIG. 9, a roll $R_1$ is a delivery roll, and $R_2$ and $R_3$ each represents a nip roll or preheat roll without driving system. $R_4$ and $R_5$ each represents a roll with driving system, in which peripheral speed can be controlled as desired. Also, the pressure between $R_2$ and $R_5$ can be controlled by hydraulic pressure. $R_6$ is a wind-up roll with driving system, and wind-up speed is controlled by tension control. The rolls $R_2$ to $R_5$ are provided with built-in heaters, and temperature sensor is mounted on roll surface. The temperature detected by the temperature sensor is fed back to the heater, and temperature is controlled with accuracy of ±1° C. by PID control.

Molding condition of the film F-2 in the apparatus shown in FIG. 9 is as follows:

Peripheral speed of $R_4$ and $R_5$: 2.8m/min and 1.9 m/min.

Surface temperature of $R_4$ and $R_5$: 145° C.

Force applied on the film squeezed between $R_4$ and $R_5$: 2000 kg

Diameter of rolls $R_4$ and $R_5$: 150 mm

Next, lateral uniaxial stretching was performed on the film F-2 thus obtained by tenter, and the film (F-3) was obtained. The stretching condition was as follows:

Stretching temperature: 160° C.

Percent of stretch: 7%

Film delivery speed: 3 m/min.

[Determination of optical property]

Figure 10:
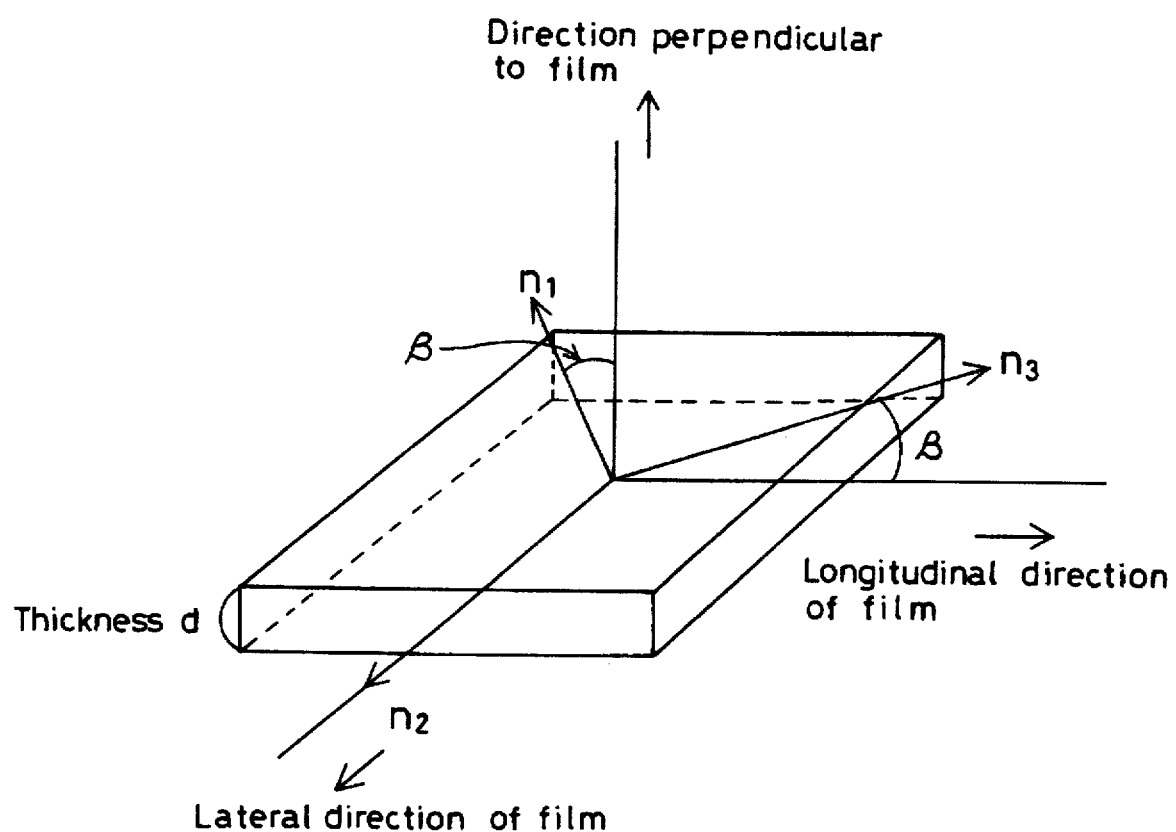
FIG. 10 is a drawing for explaining relationship of 3-axial refractive index.

On the optically anisotropic elements of the film F-1, F-2 and F-3 in Example 4A, dependency of retardation value Re on oblique incident angle was determination using ellipsometer AEP-100 (Shimadzu Corporation) in transmission mode. Refractive index in lateral direction and film thickness were measured using Abbe's refractometer and micrometer respectively. From these measured values, 3-axial refractive index and inclining angle of main refractive index axis were calculated. FIG. 10 shows the relationship of 3-axial refractive index thus calculated. Here, $n_1$ is the lowest refractive index, $n_2$ is refractive index in lateral direction, $n_3$ is another main refractive index crossing perpendicularly to the direction of $n_2$, and β is an angle, at which $n_1$ is inclined from the direction perpendicular to the film. The results are summarized in Table 7.

TABLE 7

| Film | $n_1$ | $n_2$ | $n_3$ | $n_1$ inclined angle β | Δn × d |
|---|---|---|---|---|---|
| F-1 | 1.5830 | 1.5830 | 1.5830 | — | 0 nm |
| F-2 | 1.5805 | 1.5821 | 1.5868 | 18° | 372 nm |
| F-3 | 1.5804 | 1.5835 | 1.5836 | 23° | 326 nm |
| F-4 | 1.5810 | 1.5845 | 1.5844 | 0° | 326 nm |
| F-5 | 1.5817 | 1.5820 | 1.5867 | 0° | 265 nm |
| F-6 | 1.5803 | 1.5835 | 1.5835 | 22° | 330 nm |
| F-7 | 1.5807 | 1.5832 | 1.5839 | 35° | 268 nm |

(Note)
Δn = ($n_2$ + $n_3$) ÷ 2 − $n_1$ (Comparative example 4A)

The film F-1 prepared in Example 4A was rolled through calender rolls heated at 150° C., and surface orientation film (F-4) was prepared. Optical property was determined by the same procedure as in Example 4A. This film F-4 is a negative uniaxial film with its optical axis running in a direction perpendicular to film surface. The results are given in Table 1.

(EXAMPLE 4B)

Lateral uniaxial stretching was performed on the film F-1 prepared in Example 4A under temperature condition of 160° C. using tenter, and the film (F-5) was obtained. The percent of stretch in this case was 7%. From the film F-5, film was molded under the same condition as in Example 4A using the apparatus of FIG. 9 of Example 4, and the film (F-6) was obtained. On the films F-5 and F-6, optical property was determined by the same procedure as in Example 4A. The results are given in Table 7. The film F-5 has the relationship $n_{TD} \geq n_{MD}$, and the film F-6 was a negative uniaxial film with its optical axis inclined in the same manner as in the film F-3 prepared in Example 4A.

(EXAMPLE 4C)

The film F-4 prepared in Comparative example A was molded by the apparatus shown in FIG. 9, and the film (F-7) was obtained. The condition was as follows:

Peripheral speed of $R_4$ and $R_5$: 2.0 m/min. and 1.9 m/min.
Surface temperature of $R_4$ and $R_5$: 148° C.
Force applied on the film squeezed by $R_4$ and $R_5$: 2000kg
Diameter of rolls $R_4$ and $R_5$: 150 mm On the film F-7 thus obtained, optical property was determined by the same procedure as in Example 4A. The results are shown in Table 7. The film F-7 was a negative uniaxial film with its optical axis inclined.

(EXAMPLE 4D)

[Evaluation of visual angle characteristics]

For the case where the films F-3, F-4, F-6 and F-7 in the above Examples 4A to 4C and Comparative example 4A were used on TN liquid crystal cell CE as the optically anisotropic element RF of FIG. 1 and for the case where such film is not arranged, visual angle characteristics of 0V/5V contrast were determined by LCD-5000 (Otsuka Electronics Co., Ltd.) by applying voltage with rectangular wave of 30 Hz on the liquid crystal cell CE. The position of the contrast 10 was defined as visual angle, and the results of visual angle characteristics (upper, lower, left and right) are shown in Table 8. In this case, TN liquid crystal cell CE was arranged in such manner that rubbing axis on the polarizing plate B side is at 135° with respect to X-axis, polarizing axis PA of the polarizing plate A is at 45° to X-axis, and polarizing axis PB of the polarizing plate B is at 135° to X-axis. The retardation value Re, i.e. ($n_e - n_0$)×gap size, of the liquid crystal cell CE used here was 470 nm, and twist angle was 90°.

TABLE 8

| | Film | Upper | Lower | Left | right |
|---|---|---|---|---|---|
| The present invention | F-3 | 53° | 45° | 50° | 55° |
| The present invention | F-6 | 55° | 46° | 51° | 55° |
| The present invention | F-7 | 45° | 25° | 48° | 51° |
| Comparison | F-4 | 24° | 13° | 33° | 50° |
| Comparison | None | 29° | 18° | 33° | 36° |

The above results suggest that visual angle characteristics of TN type liquid crystal display element can be improved by the present invention and it is possible to provide a liquid crystal display element for high quality display.

As described above, when the optically anisotropic element of the present invention is used in TN type liquid crystal display element, visual angle characteristics are improved and it is possible to provide a liquid crystal display element with high quality display with excellent visibility. It is needless to say that excellent effects can be obtained if the optically anisotropic element of the present invention is applied to active matrix type liquid crystal display element using 3-terminal or 2-terminal element such as TFT or MIM.

What we claim are:

1. A liquid crystal display element, comprising an optically anisotropic element, in which a twist nematic liquid crystal is arranged between two electrode substrates and two polarizing elements disposed on both sides thereof, said optically anisotropic element being disposed between said twist nematic liquid crystal and said polarizing element, wherein said optically anisotropic element has sheet-like structure and a sheet surface, and exhibits negative uniaxial property, the optical axis of said anisotropic element is inclined at an angle of 10° to 40° from a direction perpendicular to the sheet surface, and said optically anisotropic element contains low molecular weight liquid crystal oriented in macromolecular matrix.

2. A liquid crystal display element according to claim 1, wherein orientation of said low molecular weight liquid crystal is fixed by one or more of cross-linking between said macromolecular matrix, cross-linking between said low molecular weight liquid crystals, or cross-linking between said macromolecular matrix and said low molecular weight liquid crystal.

3. A method for manufacturing an optically anisotropic element, which has sheet-like structure and a sheet surface, exhibits negative uniaxial property and the optical axis of said anisotropic element is arranged neither perpendicularly nor in parallel to the sheet surface, wherein said anisotropic element is formed by dispersing low molecular weight liquid crystals in macromolecular matrix, and the optical axis of said anisotropic element is adjusted by applying electric field or magnetic field to said liquid crystals.

\* \* \* \* \*